April 16, 1968     C. A. DEHNE     3,377,962
SIDE LINK AND PUSHER FOR CONVEYOR CHAINS
Filed Dec. 23, 1965
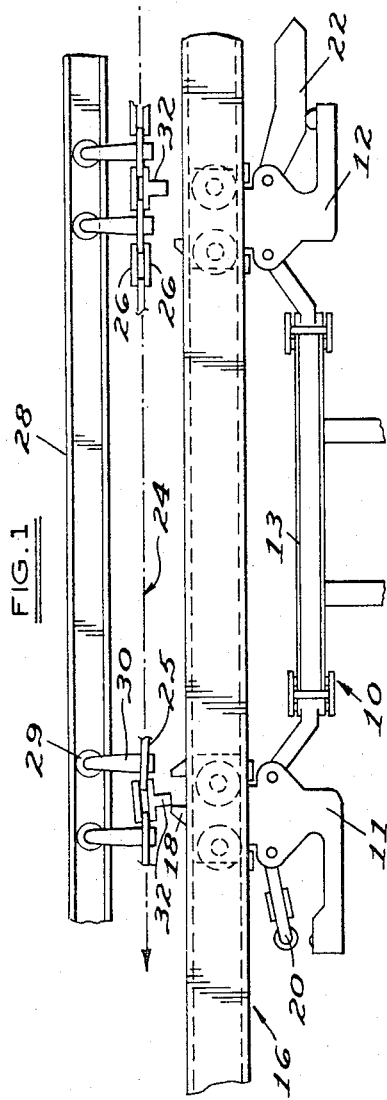
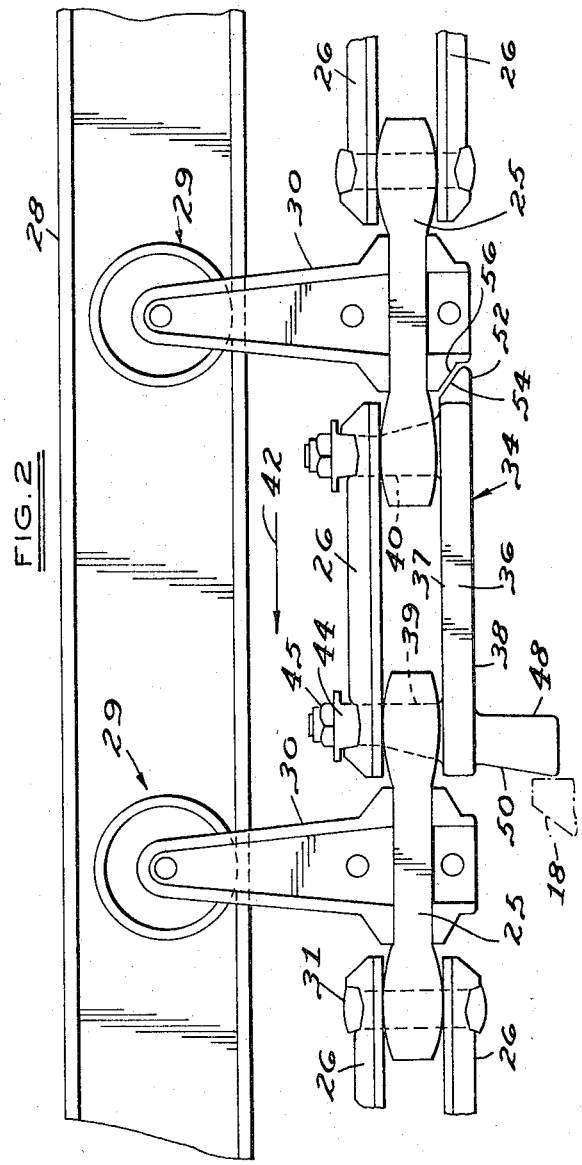
INVENTOR.
CLARENCE A. DEHNE
BY
*Farley, Forster & Farley*
ATTORNEYS 000
United States Patent Office 3,377,962
Patented Apr. 16, 1968

3,377,962
SIDE LINK AND PUSHER FOR CONVEYOR CHAINS
Clarence A. Dehne, Orchard Lake, Mich., assignor to Jervis B. Webb Company, a corporation of Michigan
Filed Dec. 23, 1965, Ser. No. 515,885
5 Claims. (Cl. 104—172)

ABSTRACT OF THE DISCLOSURE

A side bar and pusher for a carrier-propelling conveyor chain of the type formed by pin-connected alternate center links and pairs of side bars suspended from a track by trolleys each having a depending body portion secured to a selected center link. The side bar and pusher has an integrally formed connecting pin and a pusher member projecting oppositely from the side bar in substantially aligned relation at the forward end thereof, the pusher having a forwardly inclined driving face and the side bar may include a rearward projection adapted to overlap and engage the body portion of a trolley secured to the adjacent center link of the chain.

---

This invention relates to an improved side link and pusher for the propelling chain of power and free conveyors. A chain of this type conventionally consists of pin-connected alternate center links and pairs of side bars, and the chain is suspended from a track by trolleys which are connected to selected center links of the chain. Certain side bars are equipped with a lug or pusher projecting outwardly of the chain and adapted to engage a driving dog of a conveyor carrier supported on a separate track.

In the normal operation of power and free conveyors, the propelling chain is continuously driven. The carriers, however, may be stopped by disengaging their driving dog from a chain pusher and then started by positioning the driving dog for engagement by the next advancing pusher of the continuously moving chain. When a stopped carrier is thus engaged by a pusher the resulting impact can produce enough separating movement between the pusher and driving dog to result in the pusher riding over the dog and leaving the carrier behind. This separating movement results from the normal tolerances permitted in the manufacture of these conveyor parts, particularly in the chain, so that the impact is accompanied by a cocking action in the chain which moves a pusher in a direction away from driving engagement with the carrier dog, and which at the same time may cause a depressing motion of the dog so that the dog and pusher lose driving engagement.

The objects of the present invention are to provide a side link and pusher having a more positive engagement with the dog of a carrier, and which resists relative separating movement between the pusher and carrier dog.

The improved side bar and pusher of the invention comprises a side bar member having inner and outer faces, an integrally formed connecting pin projecting from the inner face of the side bar adjacent one end thereof for engaging a center link of the chain, and an integrally formed pusher member projecting from the outer face of the side bar oppositely to the connecting pin and substantially aligned therewith. The pusher member is preferably located at the forward end of the side bar with relation to the forwarding direction of travel of the propelling chain; the pusher is preferably provided with a driving face inclined forwardly and downwardly for biting engagement with the carrier driving dog; and, relative separating movement of the pusher and driving dog is further resisted by the provision of a rearwardly projecting portion on the side bar which is adapted to overlap and abut the body of a trolley secured to an adjacent center link of the chain upon cocking movement of the chain resulting from the impact between the pusher and driving dog.

Other features and advantages of the invention will appear from the following description of the representative embodiment disclosed in the accompanying drawings in which:

FIGURE 1 is a side elevation of a power and free conveyor illustrating the relative separating movement which takes place between a conventional pusher and driving dog of a carrier upon impact; and FIGURE 2 is a side elevation on an enlarged scale showing the improved side link and pusher of the invention in its relation to the other elements of the propelling chain and chain suspending trolleys.

In FIG. 1, a carrier 10 consisting of forward and rear trolleys 11 and 12 interconnected by a load bar 13, travels on a supporting track 16. The forward trolley 11 is equipped with a driving dog 18 which may be of the type movable to non-driving position by operation of a dog releasing lever 20 engaging a rearwardly projecting cam 22 of a preceding carrier.

A continuously driven propelling chain 24, consisting of alternate center links 25 and pairs of side bars 26 is supported from an upper track 28 by trolleys 29, and as more clearly shown in FIG. 2, the conventional pairs of side bars 26 are connected to the adjacent center links 25 by headed pivot pins 31; the body portion 30 of the trolleys 29 extends through and engages the center links 25; and where the chain includes a side bar 26 and pusher side bar 32, each adjacent center link 25 is preferably supported by a trolley 29. These chain parts are made to fit loosely together for free articulation.

Assuming the carrier 10 has been stopped for some reason by movement of its drive dog 18 to a non-driving position and the drive dog has been returned to driving position to be picked up by the next advancing pusher 32, the result of the ensuing impact between the pusher and drive dog is illustrated at the left in FIG. 1. The impact produces a cocking movement of the pusher 32 and chain parts causing a separating action between the pusher 32 and drive dog 18, which can be further augmented by the pusher exerting a component of force on the drive dog 18 tending to cam the dog to non-driving position. This combination of factors can produce enough relative separating movement between the pusher 32 and drive dog 18 for the pusher to ride over the dog leaving the carrier behind.

The likelihood of such a malfunction is greatly minimized by the improved side link and pusher 34 of the invention, shown in FIG. 2 in its relation with the other components of the propelling chain and supporting trolleys.

The improved side bar and pusher 34 includes a side bar member 36 having an inner face 37 and an outer face 38. A pair of connecting pins 39 and 40 project from the inner face of the side bar member 36 adjacent the forward and rearward ends thereof with relation to the forwarding direction of travel of the chain as indicated by the arrow 42. Each of the connecting pins 39 and 40 is adapted to engage an adjacent center link 25 and the opposing side bar 26, with special washers 44 and nuts 45 being employed to connect the opposing side bar 26 to the pins 39 and 40.

A pusher member 48 projects from the outer face 38 of the side bar member oppositely to the forward connecting pin 39 and substantially aligned therewith. The pusher member 48 includes a driving face 50 extending outwardly and inclined forwardly for biting, non-camming engagement with the carrier driving dog 18. Both the pusher and connecting pins may be formed integrally with the side bar member 36, as shown.

This side bar and pusher 34 is preferably provided at its opposite or rearward end with a portion 52 projecting longitudinally of the side bar member 36 for overlapping abutting relation with the body 30 of a trolley secured to the adjacent center link 25 in the event of cocking movement of the chain, and this projecting portion 52 has a rearwardly and outwardly sloping surface 54 engageable with a complementary surface 56 on the trolley body. As a general rule the greater the pitch of the chain, or distance between adjacent connecting pins, the greater the amount of cocking movement possible and with smaller pitch chain—for example, the common four inch pitch, sufficiently positive biting and driving engagement between the pusher 48 and carrier dog 18 can be obtained without employing the rearwardly projecting portion 52.

In the improved construction, more positive driving engagement is obtained by forming the pusher 48 opposite one of the connecting pins which greatly reduces the tipping or cocking moment on the chain resulting from impact; and, the biting engagement produced by the inclined driving face 50 further reduces separating movement between the chain and drive dog 18 and prevents the chain from exerting a camming or releasing action upon the drive dog. Cocking movement of the chain can produce and be further augmented by tipping movement of the suporting trolleys. Both cocking chain movement and trolley tipping movement are further resisted by the rearwardly projecting portion 52 of the improved side link and pusher which abuts the body 30 of the adjacent trolley so that the side link and trolley act to mutually stabilize each other against both cocking and tipping motion.

Obviously these improvements result in a more positive driving engagement between a pusher and driving dog at all times and act to prevent loss of driving engagement through surges in power, in traversing upgrades as well as in positively picking up a stopped carrier.

While preferred embodiments have been described above in detail, it will be understood that numerous modifications might be resorted to without departing from the scope of the invention as defined in the following claims.

I claim:

1. A side bar and pusher for a carrier-propelling conveyor chain of the type formed by alternate center links and pairs of side bars connected by pins and suspended from a track by trolleys each having a depending body portion which is secured to a selected one of the center links, the side bar and pusher comprising a side bar member having inner and outer faces, a connecting pin projecting from the inner face of the side bar adjacent the forward end thereof for engaging a center link, and a pusher member projecting from the outer face of the side bar in substantial alignment with said connecting pin, the pusher member having a driving face extending outwardly and forwardly of the side bar with relation to the forwarding direction of movement of the conveyor chain.

2. A side bar and pusher as claimed in claim 1 wherein the side bar member further includes a portion projecting longitudinally from the rearward end thereof and adapted for overlapping engagement with said depending body portion of a trolley secured to the adjacent center link of the conveyor chain.

3. A side bar and pusher as claimed in claim 2 wherein the longitudinally projecting portion of the side bar member is provided with a surface inclined rearwardly and outwardly of the side bar member for engagement with a complementary surface on the trolley body upon cocking movement of the chain.

4. A side bar and pusher as claimed in claim 1 wherein the connecting pin and pusher member are integrally formed with the side bar member.

5. A side bar and pusher as claimed in claim 4 further comprising a second connecting pin integrally formed with the side bar member and projecting from the inner face thereof adjacent the other end thereof.

References Cited

UNITED STATES PATENTS

| | | | |
|---|---|---|---|
| 2,966,863 | 1/1961 | Heichel | 104—170 |
| 3,044,416 | 7/1962 | Reibel et al. | 104—172 |
| 3,091,191 | 5/1963 | Fur | 104—172 |
| 3,092,038 | 6/1963 | Orwin | 104—172 |
| 3,314,378 | 4/1967 | Potter et al. | 104—172 X |

ARTHUR L. LA POINT, *Primary Examiner.*

DRAYTON E. HOFFMAN, *Examiner.*